United States Patent
Yamasaki et al.

(10) Patent No.: US 7,937,183 B2
(45) Date of Patent: May 3, 2011

(54) MOLDED-COMPONENT STRESS-STRAIN CURVE ESTIMATION DEVICE

(75) Inventors: Hiroki Yamasaki, Toyota (JP); Yuan Zhong, Nagoya (JP); Noritaka Takagi, Kasugai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1026 days.

(21) Appl. No.: 11/747,457

(22) Filed: May 11, 2007

(65) Prior Publication Data

US 2007/0270989 A1 Nov. 22, 2007

(30) Foreign Application Priority Data

May 22, 2006 (JP) ................................. 2006-141131

(51) Int. Cl.
*G06F 19/00* (2011.01)
(52) U.S. Cl. .......................................... 700/204; 700/97
(58) Field of Classification Search .................. 700/197, 700/204; 703/7
See application file for complete search history.

(56) References Cited

U.S. PATENT DOCUMENTS

| 5,569,860 | A | 10/1996 | Aizawa et al. | |
| 2006/0282186 | A1* | 12/2006 | Hansen et al. | 700/97 |

FOREIGN PATENT DOCUMENTS

| DE | 195 16 463 A1 | 11/1995 |
|---|---|---|
| DE | 199 17 045 A1 | 2/2000 |
| EP | 0 715 161 A1 | 6/1996 |
| JP | 2871894 | 1/1999 |
| JP | 2001-121242 | 5/2001 |
| JP | 2003-164954 | 6/2003 |
| JP | 2004-174512 | 6/2004 |
| JP | 2005-14378 | 1/2005 |
| JP | 2006-26723 | 2/2006 |
| WO | WO 97/24590 | 7/1997 |
| WO | WO 97/40359 | 10/1997 |

OTHER PUBLICATIONS

Machine Translation of JP 2005-014378.*
Machine Translation of JP 2006-026723.*
Machine Translation of JP 2003-164954.*

* cited by examiner

*Primary Examiner* — Ryan A Jarrett
(74) *Attorney, Agent, or Firm* — Oblon, Spivak, McClelland, Maier & Neustadt, L.L.P.

(57) ABSTRACT

A molded-component characteristic estimation device that estimates the stress-strain curve of each portion of a molded-component includes a storage unit that stores correlation data showing the correlation between solidification time and mechanical characteristics of a material for the molded-component; and a controller that estimates solidification time of each portion of the molded-component using a shape model of the molded-component, calculates a mechanical characteristic value of each portion based on the correlation data and the estimated solidification time, and estimates the stress-strain curve of each portion of the molded-component based on the calculated mechanical characteristic value. With this device, the stress-strain curve of each portion of the molded-component is estimated without actual measurement.

11 Claims, 10 Drawing Sheets

MOLDED-COMPONENT STRESS-STRAIN CURVE ESTIMATION DEVICE

INCORPORATION BY REFERENCE

The disclosure of Japanese Patent Application No. 2006-141131 filed on May 22, 2006 including the specification, drawings and abstract is incorporated herein by reference in its entirety.

BACKGROUND OF THE INVENTION

1. Field of the Invention

The invention relates to a technology for estimating the stress-strain behavior of various portions of a molded-component.

2. Description of the Related Art

The advent of computer aided engineering (CAE) has made it possible to execute computer simulations such as a crash analysis, a vibration analysis and a stress analysis at the stage of product design. As a result, the safety and durability of a product can be evaluated in advance. In such computer simulations, the shape and characteristic values of the product targeted for the analyses need to be presented in the forms of numeric models. Therefore, the degrees of accuracies of such numeric models have considerable influences on the analysis results.

Some components included in the product may be manufactured by casting (these components will be referred to as the "molded-components"). The stress-strain behavior of the molded-component is not entirely uniform, namely, the stress-strain behavior varies from portion to portion of the molded-component. Such variations occur due, mainly, to the variations in the solidification time among the portions during casting. Accordingly, the numeric models should be prepared with the stress-strain distribution in the molded-component taken into account in order to obtain accurate analysis results through CAE.

However, an actual molded-component may not be available at the stage of product design. Even if an actual molded-component is present, there may be some portions from which test pieces used for a tensile test cannot be cut out due to the shape of the molded-component. Accordingly, it is difficult to actually measure the stress-strain distribution in the entire molded-component. In addition, one product usually has several tens of thousands to several millions of portions, and, therefore, it is impractical to actually measure the stress-strain behavior of all these portions.

Japanese Patent No. 2871894 (Japanese Patent Application Publication No. 04-361849 (JP-A-04-361849)) and Japanese Patent Application Publication No. 2001-121242 (JP-A-2004-121242)) describe the method for optimizing, using a computer, a die used to form a molded-component and the condition under which casting is performed. Japanese Patent Application Publication No. 2004-174512 (JP-A-2004-174512) describes the method for analyzing, using a computer, a strain and a stress caused in a molded-component. However, the variations in the stress-strain behavior from portion to portion of a molded-component due to the variations in the solidification time are not taken into account in execution of these methods.

SUMMARY OF THE INVENTION

The invention is made in light of the above-described circumstances. The invention, therefore, provides a technology for making it possible to accurately estimate the stress-strain curves of various portions of a molded-component without actual measurement.

A first aspect of the invention relates to a molded-component characteristic estimation device that estimates a stress-strain curve of each portion of a molded-component. The molded-component characteristic estimation device includes a storage unit that stores the correlation data showing the correlation between the solidification time and the mechanical characteristics of a material for the molded-component; and a controller that estimates the solidification time of each portion of the molded-component using a shape model of the molded-component, calculates the mechanical characteristic value of each portion based on the correlation data using the estimated solidification time, and estimates the stress-strain curve of each portion of the molded-component based on the calculated mechanical characteristic value.

A second aspect of the invention relates to a molded-component characteristic estimation method for estimating a stress-strain curve of each portion of a molded-component. According to the molded-component characteristic estimation method, the correlation data showing the correlation between the solidification time and the mechanical characteristics of a material for the molded-component is stored; and the solidification time of each portion of the molded-component is estimated using a shape model of the molded-component. Then, the mechanical characteristic value of each portion is calculated based on the correlation data using the estimated solidification time, and the stress-strain curve of each portion of the molded-component is estimated based on the calculated mechanical characteristic value.

A third aspect of the invention relates to a molded-component characteristic estimation computer program for estimating a stress-strain curve of each portion of a molded-component. The computer program includes the steps of storing the correlation data showing the correlation between solidification time and the mechanical characteristics of a material for the molded-component; estimating the solidification time of each portion of the molded-component using a shape model of the molded-component; calculating the mechanical characteristic value of each portion based on the correlation data using the estimated solidification time; and estimating the stress-strain curve of each portion of the molded-component based on the calculated mechanical characteristic value. A fourth aspect of the invention relates to a computer-readable medium that stores the molded-component characteristic estimation computer program according to the third aspect of the invention.

The device, method, computer program, and computer-readable medium described above make it possible to accurately estimate, without actual measurement, the stress-strain curves of various portions of a molded-component with the variation in the solidification time among the portions taken into account, using only a shape model of the molded-component.

BRIEF DESCRIPTION OF THE DRAWINGS

The features, advantages thereof, and technical and industrial significance of the invention will be better understood by reading the following detailed description of example embodiments of the invention, when considered in connection with the accompanying drawings, in which.

DETAILED DESCRIPTION OF THE EXAMPLE EMBODIMENTS

In the following description and the accompanying drawings, the present invention will be described in more detail with reference to example embodiments.

Figure 1:
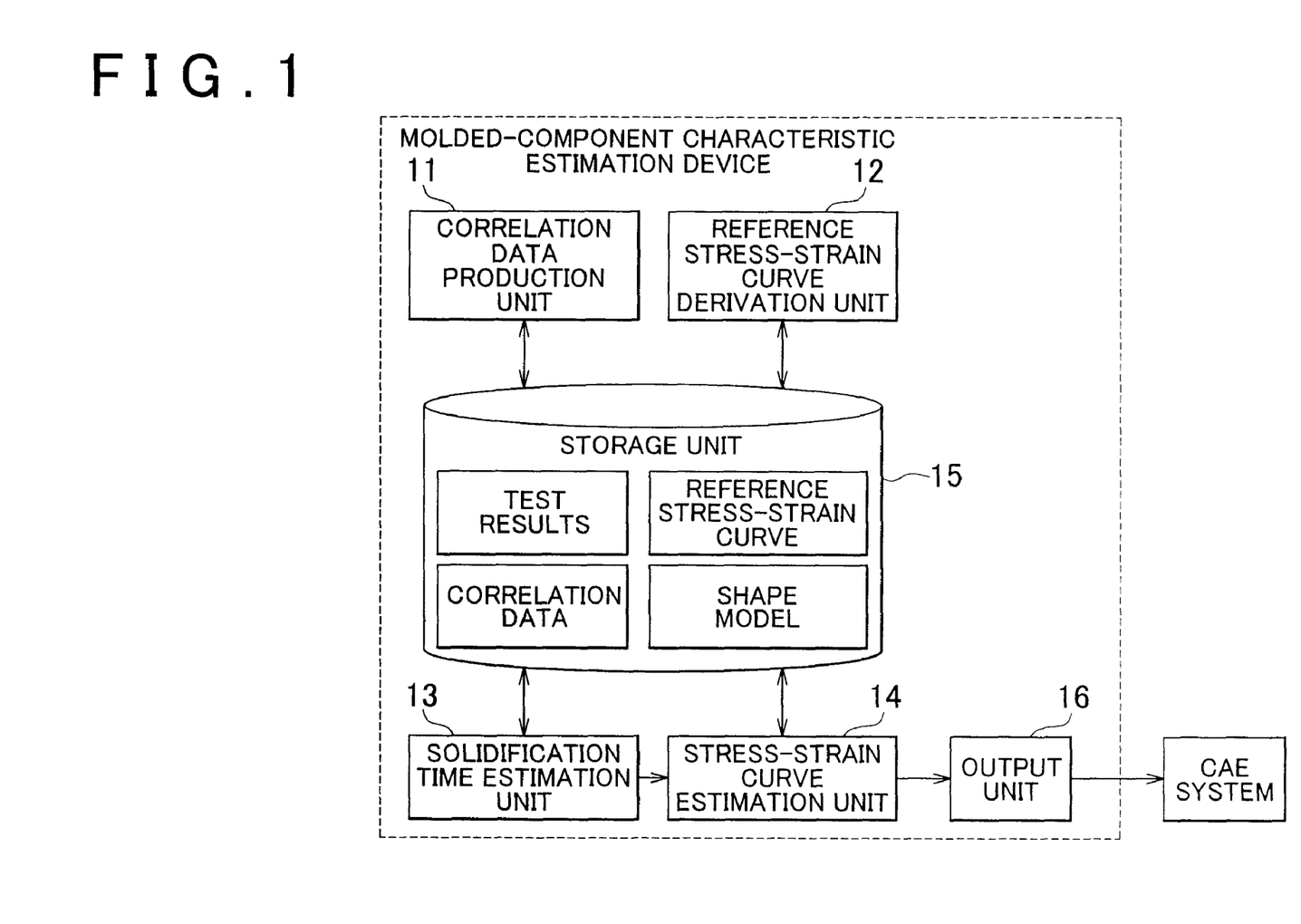
FIG. 1 illustrates the block diagram showing the functional configuration of a molded-component characteristic estimation device.

First, the structure of a molded-component characteristic estimation device according to a first embodiment of the invention will be described. FIG. 1 is the block diagram showing the functional configuration of the molded-component characteristic estimation device. As shown in FIG. 1, the molded-component characteristic estimation device includes a correlation data production unit 11, a reference stress-strain curve derivation unit 12, a solidification time estimation unit 13, a stress-strain curve estimation unit 14, a storage unit 15, and an output unit 16.

A typical molded-component characteristic estimation device may be formed of a general-purpose computer and software (programs) that runs on the computer. The general-purpose computer includes a central processing unit (CPU), a main storage unit (memory), an auxiliary storage unit (hard disk), a display unit, an input unit, an external interface (I/F), etc. The CPU executes the programs and controls the above-mentioned hardware resources according to need, whereby the functional elements shown in FIG. 1 are realized. Some or all of these functional elements may be provided with dedicated chips, and the processes thereof may be executed by the chips.

The correlation data production unit 11 has the function of producing the correlation data showing the correlation between the solidification time and the mechanical characteristic values based on the results of a tensile test. The correlation data on each material (for example, aluminum) that may be used to form the molded-component is produced. Examples of the mechanical characteristic values include a tensile strength value, a fracture strain value, and a yield stress value. In the first embodiment of the invention, two sets of correlation data, i.e., the correlation data showing the correlation between the tensile strength and the solidification time, and the correlation data showing the correlation between the fracture strain and the solidification time are used.

The reference stress-strain curve derivation unit 12 has the function of deriving the reference stress-strain curves of the molded-component based on the results of the tensile test. The reference stress-strain curves will be described later in detail.

The solidification time estimation unit 13 has the function of estimating the solidification time of various portions using a shape model of the molded-component. The shape model expresses the three-dimensional shape of the molded-component using a combination of multiple elements. The shape model may be produced based on the design data (CAD data). For example, when the finite element method (FEM) is employed, the shape model of the molded-component is expressed by a combination of plate elements, beam elements, etc. The solidification time estimation unit 13 executes a casting simulation (casting CAE) using the shape model, and calculates the solidification time of each portion (each element) of the molded-component. Because the casting simulation may be executed with a known technology, the detailed description thereof will not be provided below.

The stress-strain curve estimation unit 14 has the function of estimating the stress-strain curves of various portions of a to-be-produced molded-component based on the reference stress-strain curves and the correlation data produced based on the results of the test executed on the test component. The process executed by the stress-strain curve estimation unit 14 will be described later in detail. The stress-strain curves estimated by the stress-strain curve estimation unit 14 are passed to a CAE system via the output unit 16, and then used for the computer simulations such as the crash analysis, the vibration analysis, and the stress analysis.

The storage unit 15 is storage means formed of an auxiliary storage device, etc. The storage unit 15 appropriately stores the results of the tensile test, the correlation data, the reference stress-strain curves, the shape model, etc.

Figure 2:
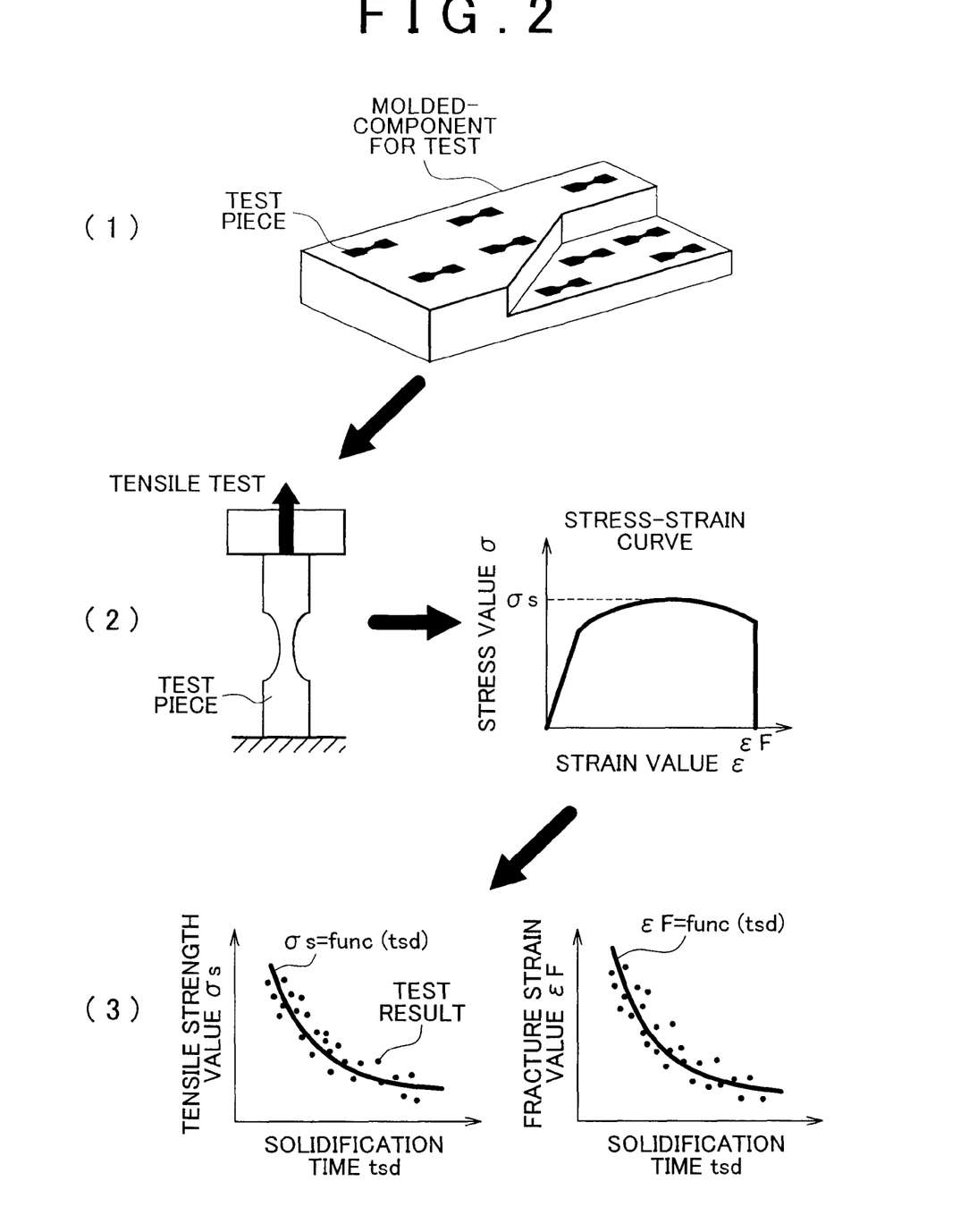
FIG. 2 illustrates the views showing the steps for producing the correlation data.

Next, the process for producing the correlation data will be described. FIG. 2 illustrates the steps for producing the correlation data.

(1) First, a test component is produced by casting, and test pieces are cut out from various portions of the test component. The test pieces should be cut out from the portions that vary in the solidification time. The solidification time of each test piece may be calculated through a casting simulation, or measured actually in advance. In the following description, the $1^{st}$ to $n^{th}$ test pieces have the solidification times tsd1 to tsdn, respectively. Although any number of the test pieces may be used (i.e., "n" may be any number), at least several hundreds of orders of test pieces should be prepared in order to ensure the reliability (accuracy) of the correlation data.

(2) Next, the tensile test is performed on each test piece to actually measure its mechanical characteristic values. Usually, the result of the tensile test is obtained in the form of a stress-strain curve (stress-strain behavior) shown in FIG. 2. The tensile strength values $\sigma s1$ to $\sigma sn$, and the fracture strain values $\epsilon F1$ to $\epsilon Fn$ of the $1^{st}$ to $n^{th}$ test pieces are obtained based on the stress-strain curves, respectively.

(3) The correlation data production unit 11 produces the correlation data showing the correlation between the solidification time tsd and the tensile strength value $\sigma s$, and the correlation data showing the correlation between the solidification time tsd and the fracture strain value $\epsilon F$, based on the above-described test results, by the data analysis method, for example, the least-square method. These correlation data are conceptually expressed by the following equations. The data form may be either a functional form or a table form.

Tensile strength value σs=func(solidification time tsd)

Fracture strain value εF=func(solidification time tsd)

The test results and the correlation data are stored in the storage unit 15, and used in the subsequent processes for deriving the reference stress-strain curves and estimating the stress-strain curves of the various portions.

Figure 3:
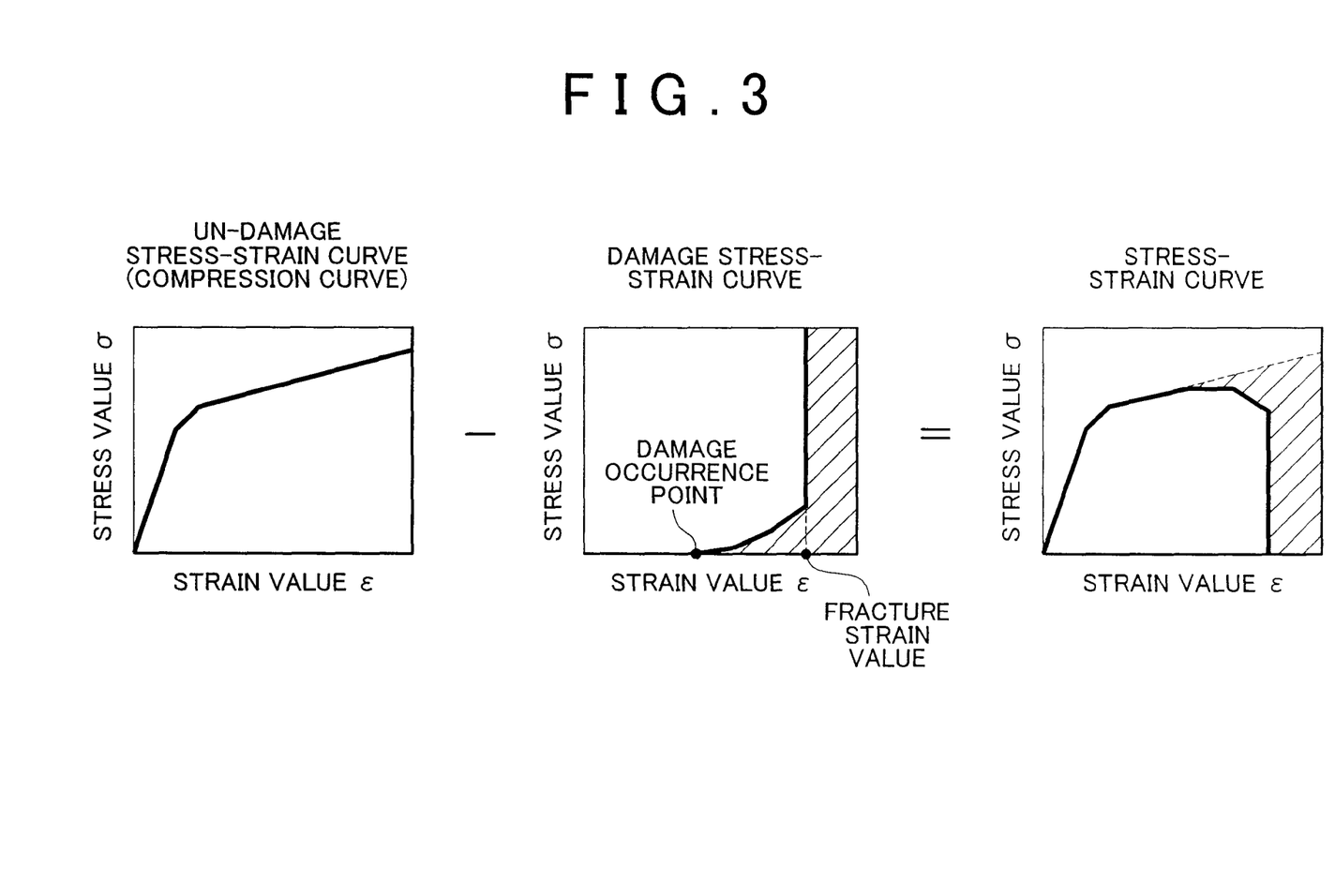
FIG. 3 illustrates the graphs for describing the un-damage stress-strain curve and the damage stress-strain curve.

Next, the process for deriving the reference stress-strain curves will be described. In the molded-component characteristic estimation device according to the first embodiment of the invention, as shown in FIG. 3, the stress-strain behavior (the stress-strain curve) of a material is expressed by the combination of the un-damage stress-strain behavior (referred to as the "un-damage stress-strain curve" where appropriate) with the damage stress-strain behavior (referred to as the "damage stress-strain curve" where appropriate). In this manner, the stress-strain behavior (the stress-strain curve) of a ductile material, for example, aluminum is appropriately expressed.

The un-damage stress-strain curve is derived on the assumption that no damage is caused to the material (which can also be referred to as the "compression curve"). Meanwhile, the damage stress-strain curve is derived on the assumption that damage is caused to the material. The damage stress-strain curve shows changes in the stress value due to the damage caused to the material. In this specification, the term "damage" refers to the phenomenon in which the ductile material is softened due to gradual growth of microscopic voids that are formed in the ductile material when it is pulled.

In the first embodiment of the invention, the reference stress-strain curve derivation unit 12 derives the reference un-damage stress-strain curve and the reference damage stress-strain curve based on the results of the tensile test. The reference curves show the reference stress-strain behavior of the material, and are collectively referred to as the "reference stress-strain curves".

Figure 4:
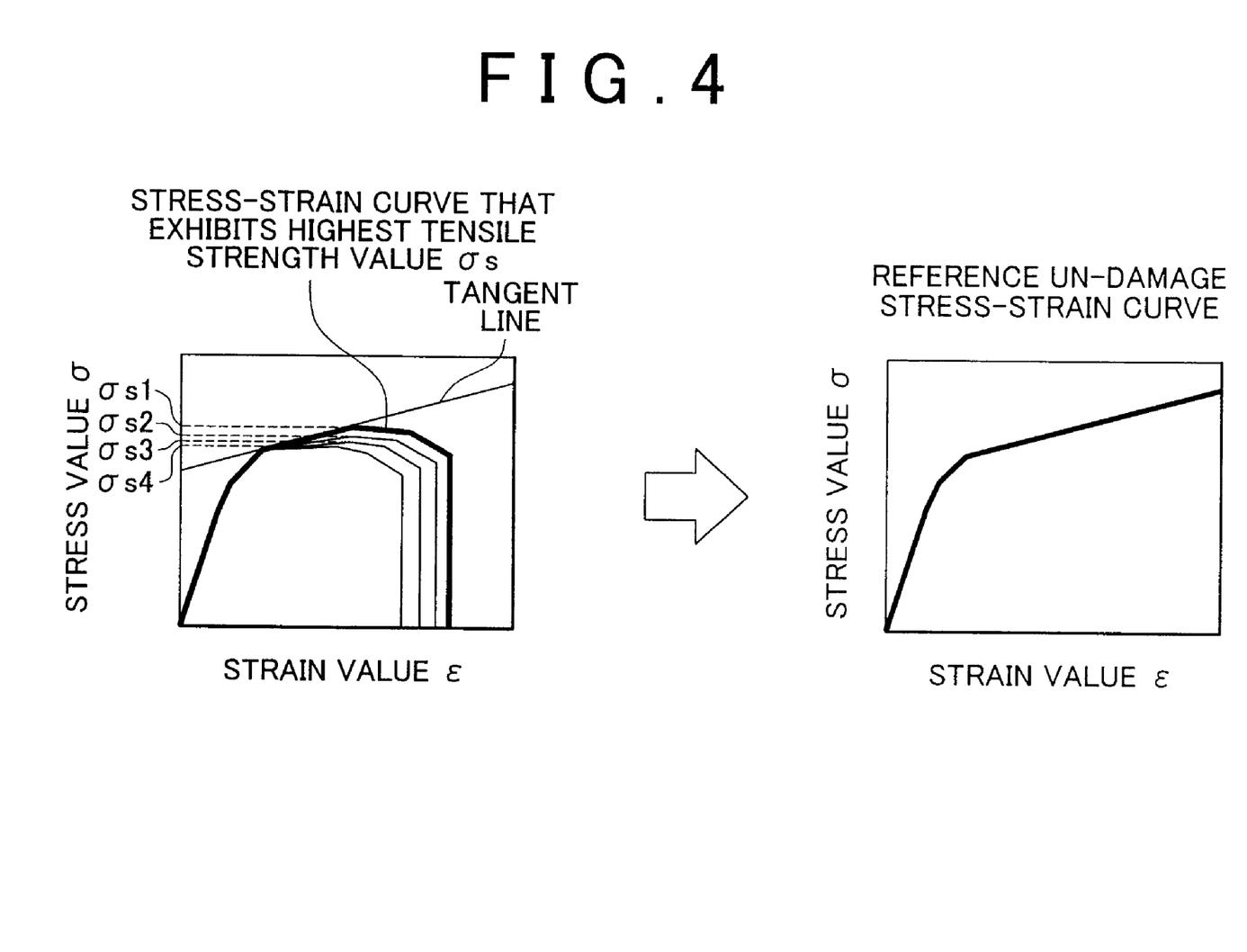
FIG. 4 illustrates the graphs for describing the process for deriving the reference un-damage stress-strain curve according to a first embodiment of the invention.

FIG. 4 shows the process for deriving the reference un-damage stress-strain curve. The reference stress-strain curve derivation unit 12 selects the stress-strain curve that exhibits the highest tensile strength value from among the tensile strength values σs of the $1^{st}$ to $n^{th}$ test pieces, which are obtained based on the test results and stored in the storage unit 15. Then, the reference stress-strain curve derivation unit 12 combines a tangent line having a predetermined gradient with the selected stress-strain curve to derive the reference un-damage stress-strain curve. In the example shown in FIG. 4, because the tensile strength value σs1 of the $1^{st}$ test piece is the highest among multiple tensile strength values σs, the reference un-damage stress-strain curve is derived based on the stress-strain curve of the $1^{st}$ test piece.

Figure 5:
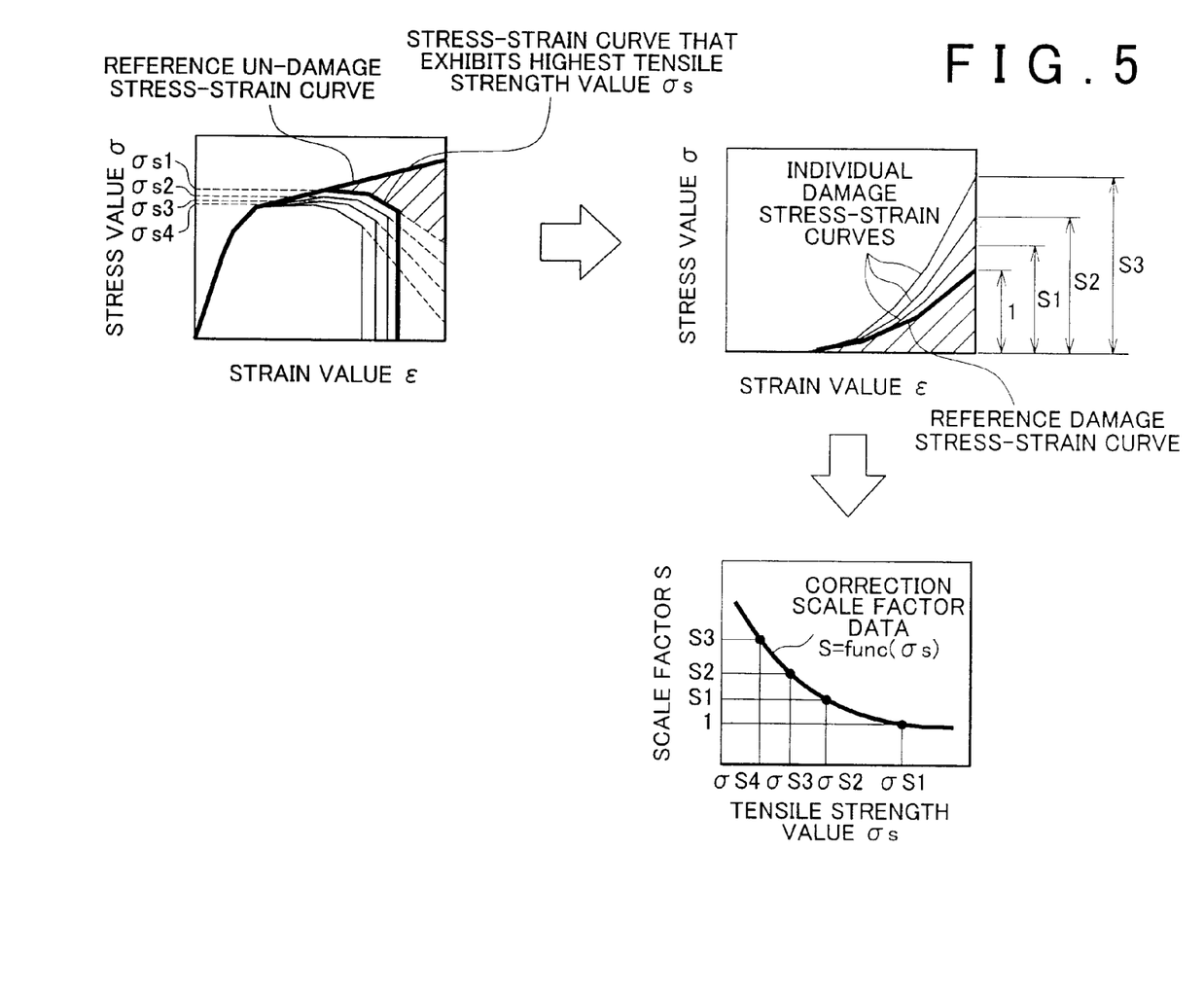
FIG. 5 illustrates the graphs for describing the process for deriving the reference damage stress-strain curve according to the first embodiment of the invention.

FIG. 5 shows the process for deriving the reference damage stress-strain curve. The reference stress-strain curve derivation unit 12 derives the reference damage stress-strain curve based on the difference between the reference un-damage stress-strain curve and the stress-strain curve of the test piece which exhibits the highest tensile strength value from among the $1^{st}$ to $n^{th}$ test pieces. The graph on the upper-right side in FIG. 5 shows the reference damage stress-strain curve. In the graph, the vertical axis represents the stress value σ, and the lateral axis represents the strain value ε. In this graph, the value indicated by the vertical axis (the stress value σ) shows the deviation of the stress value σ, correlated with a given strain value ε along the reference damage stress-stain curve, from the stress value σ, correlated with the given strain value ε along the reference un-damage stress-strain curve. The deviation shown in the graph is caused by the damage caused to the test piece.

Next, the reference stress-strain curve derivation unit 12 derives the individual damage stress-strain curves by obtaining the differences between the stress-strain curves of the other test pieces and the reference un-damage stress-strain curve.

Then, the reference stress-strain curve derivation unit 12 calculates the scale factors S for the individual stress-strain curves. The reference stress-strain curve derivation unit 12 calculates the ratio S of the stress value σ, correlated with a given strain value ε along each individual damage stress-strain curve, to the stress value σ correlated with the given strain value ε along the reference damage stress-strain curve. In this calculation, the stress value σ, correlated with the given strain value ε along the reference damage stress-strain curve, is regarded as "1". The ratio S (hereinafter, referred to as the "scale factor S") should be set such that the value obtained by multiplying the stress value σ, correlated with a given strain value ε along the reference damage stress-strain curve, by the scale factor S coincides, with the highest accuracy, with the stress value σ, correlated with the given strain value ε along the individual damage stress-strain curve. Then, the correction scale factor data that indicates the correlation between the tensile strength value σs and the scale factor S is produced by the data analysis method, for example, the least-square method (see the graph on the lower-right side in FIG. 5). The correction scale factor data is conceptually expressed by the following equation. The data form may be either a functional form or a table form.

Scale factor S=func(tensile strength value σs)

The reference un-damage stress-strain curve, the reference damage stress-strain curve, and the correction scale factor data are stored in the storage unit 15, and used for the subsequent process for estimating the stress-strain curves of the various portions of a to-be-produced molded-component.

Next, the process for estimating the stress-strain curves will be described. After the correlation data, the reference un-damage stress-strain curve, the reference damage stress-strain curve and the correction scale factor data are produced based on the results of the test performed on the test component in the above-mentioned manner, it is possible to estimate the stress-strain curves of the various portions of the to-be-produced molded-component based on the produced data.

Figure 6:
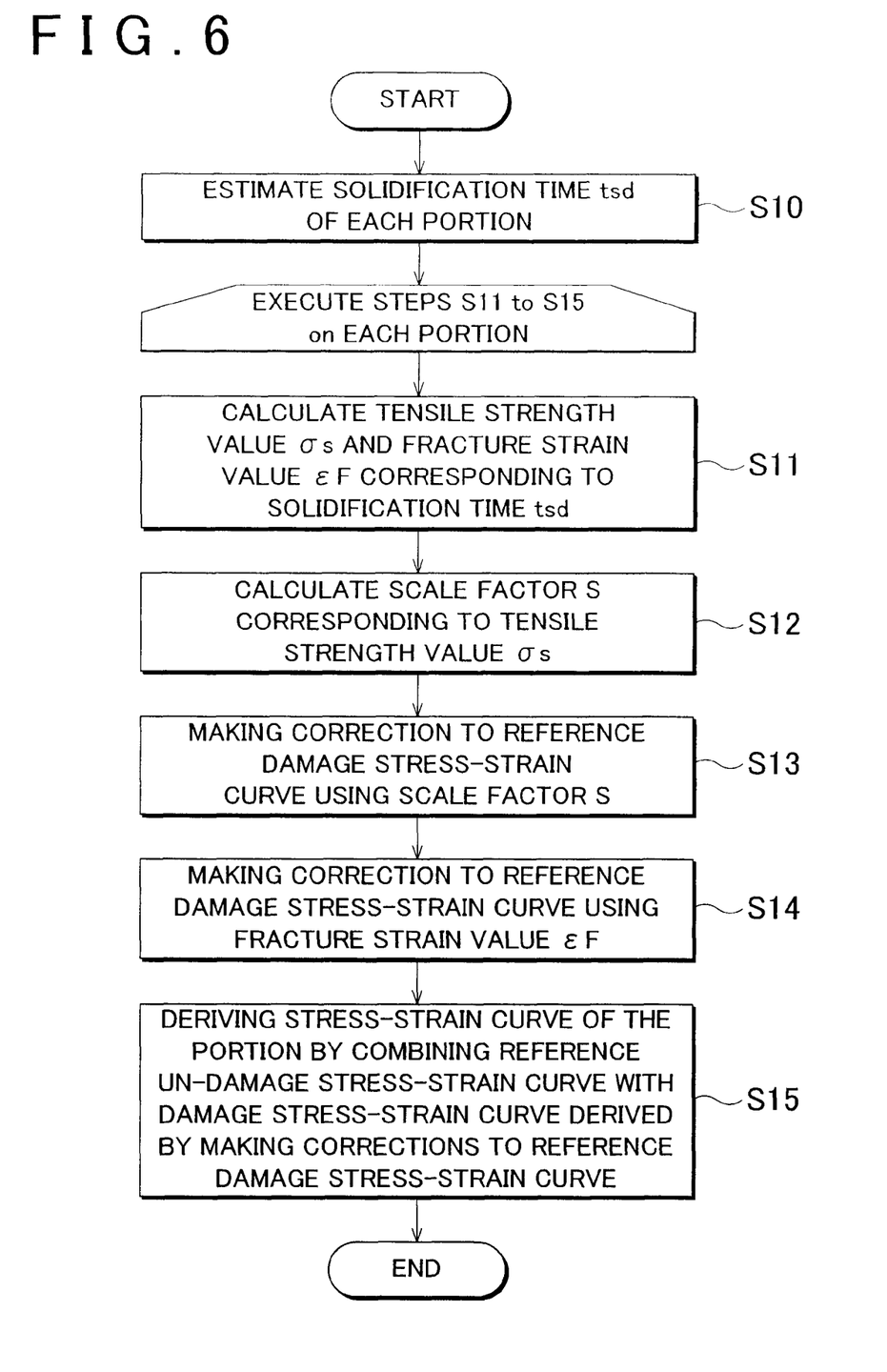
FIG. 6 illustrates the flowchart showing the steps for estimating the stress-strain curve of each portion of a to-be-produced molded-component according to the first embodiment of the invention.

With reference to the flowchart in FIG. 6, the steps for estimating the stress-strain curves of the various portions of the to-be-produced molded component will be described. First, the solidification time estimation unit 13 executes a casting simulation using the shape model of the to-be-produced molded-component, and estimates the solidification time tsd of each portion of the to-be-produced molded-component (step S10).

Next, the stress-strain curve estimation unit 14 calculates the mechanical characteristic values (the tensile strength value σs and the fracture strain value εF) of one portion of the to-be-produced molded-component based on the correlation data and the solidification time tsd estimated in step S10 (step S11).

Then, the stress-strain curve estimation unit 14 calculates the scale factor S for the portion, which corresponds to the tensile strength value σs obtained in step S11, based on the correction scale factor data and the tensile strength value σs (step S12).

The stress-strain curve estimation unit 14 derives the damage stress-strain curve of the portion by making a correction to the reference damage stress-strain curve using the scale factor S for the portion. The stress-strain curve estimation unit 14 derives the damage stress-strain curve of the portion so that the stress value σ of the portion, which is correlated with a given strain value ε, coincides with the value obtained by multiplying the stress value σ, which is correlated with the given strain value ε along the reference damage stress-strain curve, by the scale factor S for the portion (step S13). The stress-strain curve estimation unit 14 makes an adjustment such that the maximum strain value ε of the portion coincides with the fracture strain value εF calculated in step S11 (S14). According to the first embodiment of the invention, the damage stress-strain curve of the portion is derived by making a correction to the reference damage stress-strain curve. Meanwhile, the reference un-damage stress-stain curve is used as the un-damage stress-strain curve of the portion.

Figure 7:
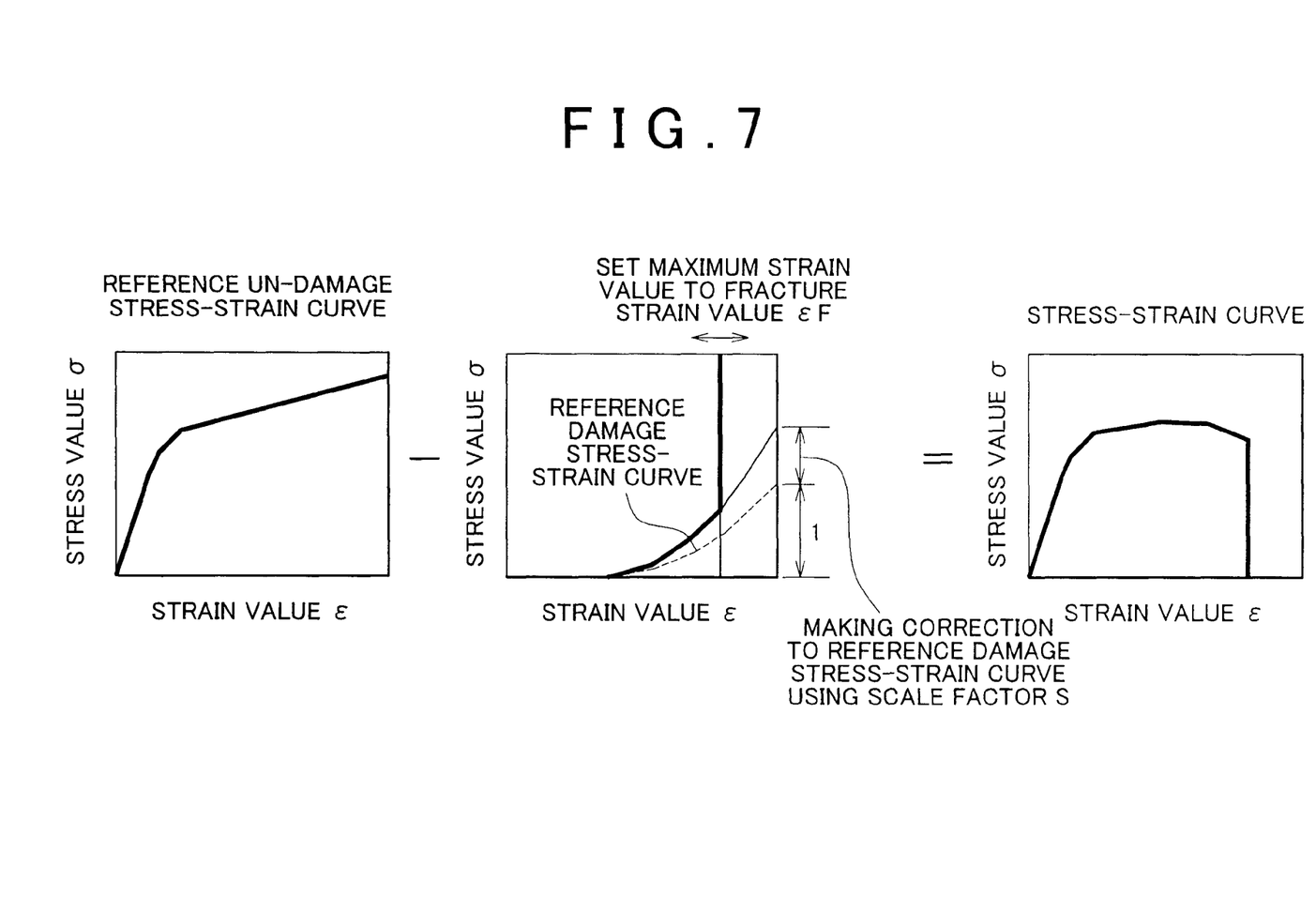
FIG. 7 illustrates the graphs for describing the manner in which the stress-strain curve of each portion of the to-be-produced molded-component is set according to the first embodiment of the invention.

Then, the stress-strain curve estimation unit 14 sets the stress-strain curve of the portion by combining the reference un-damage stress-strain curve with the damage stress-strain curve derived through the correction described above (step S15).

The stress-strain curves of the various portions of the to-be-produced molded-component are derived by repeating steps S11 to S15. In the flowchart shown in FIG. 6, steps S11 to S15 are executed on all the portions that form the shape model of the to-be-produced molded-component. Alternatively, steps S11 to S15 may be executed on only the portions that are different in the solidification time in order to increase the efficiency in execution of the process (i.e, if there are some portions that are identical in the solidification time, steps S11 to S15 may be executed on only one of these portions).

An actual molded-component may sometimes not be available at the stage of product design. Even if an actual molded-component is present, it may be sometimes difficult to actually measure the stress-strain behavior. However, the first embodiment of the invention described above makes it possible to accurately derive the stress-strain curves of the various portions of the to-be-produced molded-component with the variation in solidification time taken into account using only the shape model of the to-be-produced molded-component. Using the stress-strain curves estimated in the above-described manner improves the accuracy of the computer simulations such as the crash analysis and the vibration analysis.

Next, a second embodiment of the invention will be described. In the second embodiment, another algorithm for estimating the stress-strain curves is used. Because the structure of the molded-component characteristic estimation device and the process for producing the correlation data are the same as those in the first embodiment of the invention, the detailed description thereof will not be provided below.

Hereinafter, the process for deriving the reference stress-strain curves will be described. The reference stress-strain curve derivation unit 12 first sets the reference tensile strength value σsc and the reference fracture strain value εFc based on the tensile strength values σs and the fracture strain values εF of the test pieces, respectively. For example, the median (the medium value) of the tensile strength values σs and the median (the medium value) of the fracture strain values εF may be selected as the reference tensile strength value σsc and the reference fracture strain value εFc, respectively.

Figure 8:
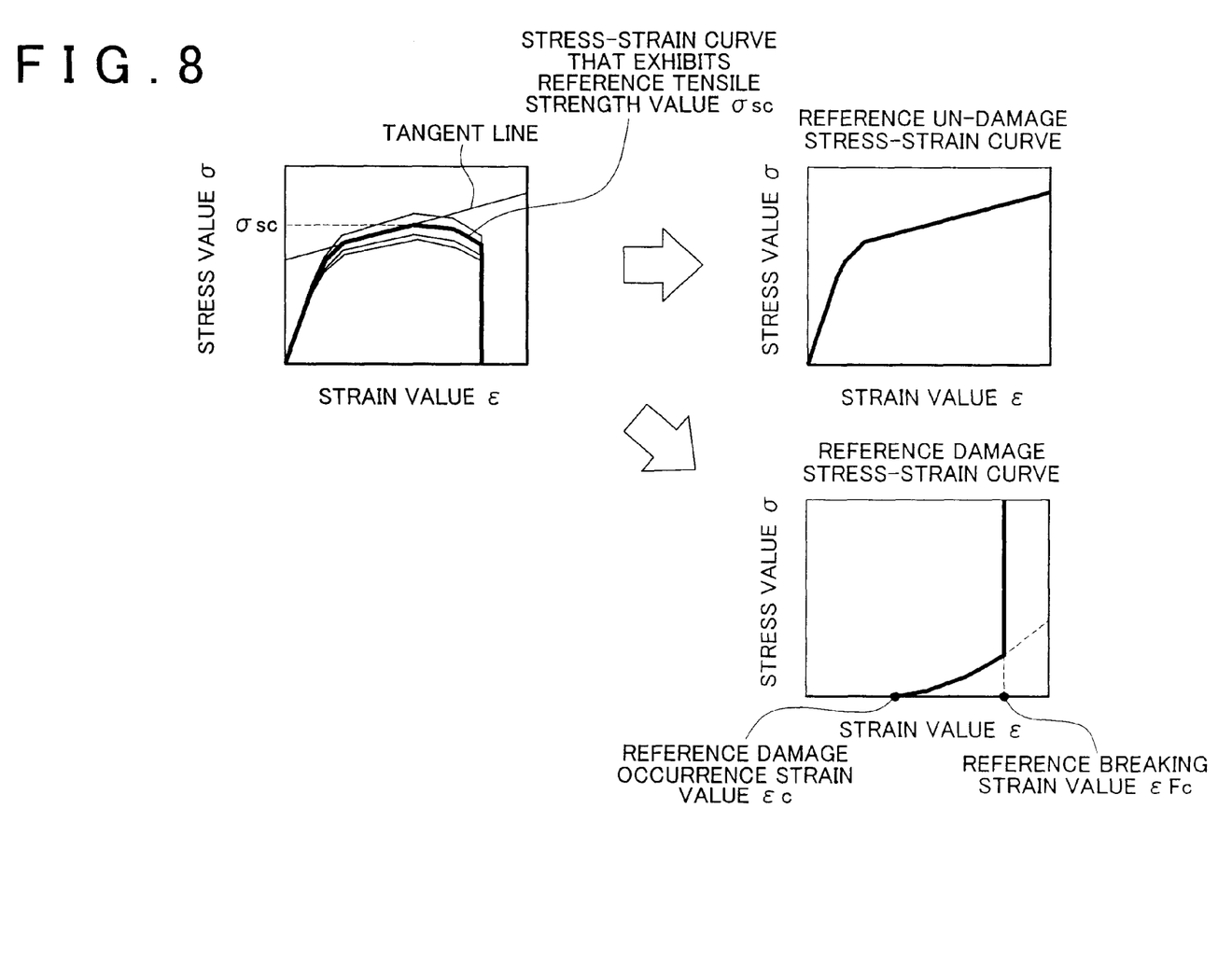
FIG. 8 illustrates the graphs for describing the processes for deriving the reference un-damage stress-strain curve and the reference damage stress-strain curve according to a second embodiment of the invention.

As shown in FIG. 8, the reference stress-strain curve derivation unit 12 derives the reference un-damage stress-strain curve and the reference damage stress-strain curve based on the stress-strain curve of the test piece that exhibits the reference tensile strength value σsc. The point on the reference damage stress-strain curve (i.e., the intercept on the axis representing the strain value ε), at which damage occurs, is referred to as the reference damage occurrence strain value εc. The maximum strain value indicated by the reference damage stress-strain curve is set to the reference fracture strain value εFc.

Next, the process for estimating the stress-strain curves of the various portions of a to-be-produced molded-component will be described. With reference to the flowchart in FIG. 9, the process for estimating the stress-strain curves will be described.

Figure 9:
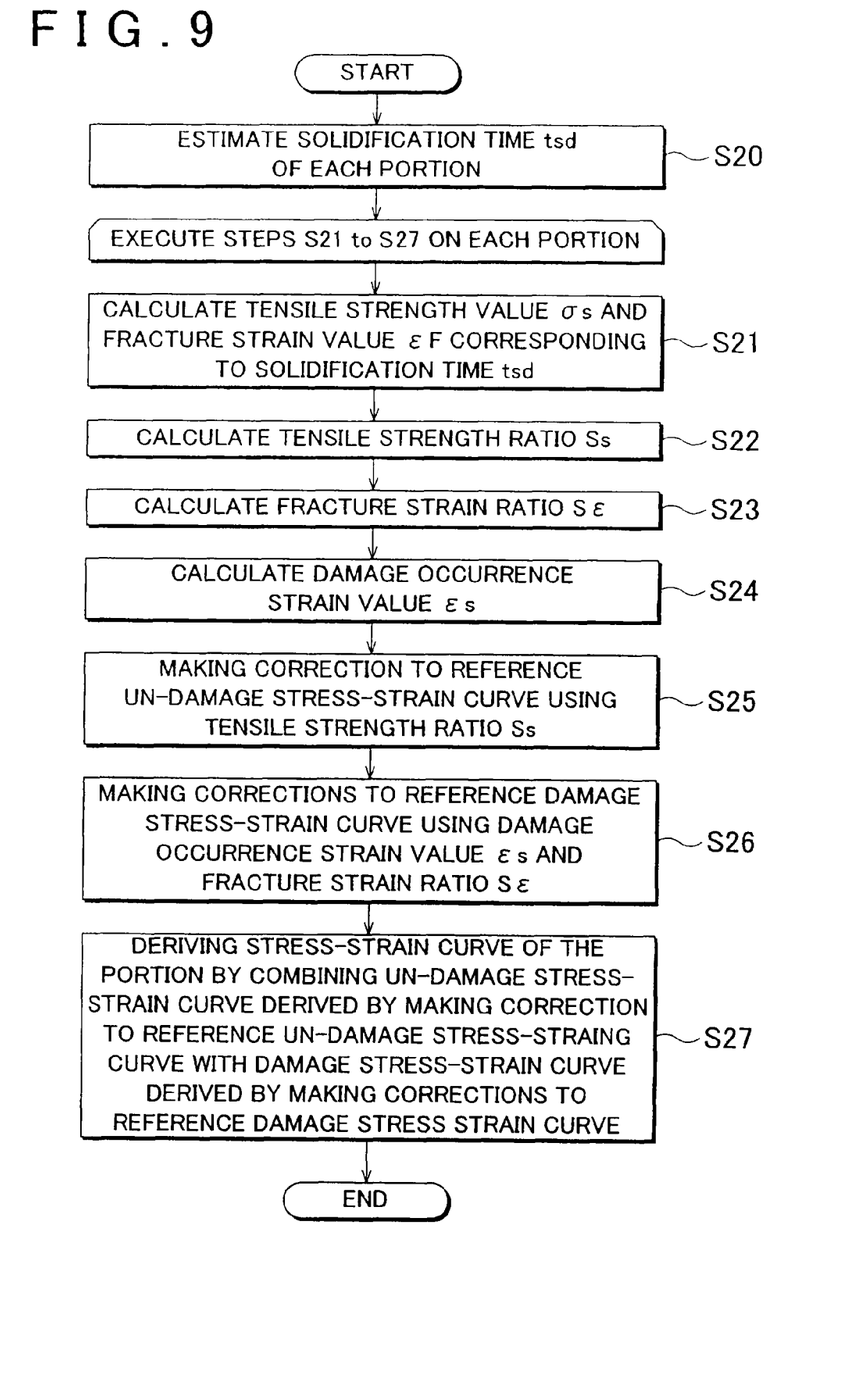
FIG. 9 illustrates the flowchart showing the steps for estimating the stress-strain curve of each portion of a to-be-produced molded-component according to the second embodiment of the invention.

First, the solidification time estimation unit 13 executes a casting simulation using the shape model of the to-be-produced molded-component to estimate the solidification time tsd of each portion of the to-be-produced molded-component (step S20).

Next, the stress-strain curve estimation unit 14 calculates the mechanical characteristic values (the tensile strength value σs and the fracture strain value εF) of one portion of the to-be-produced molded-component based on the correlation data and the solidification time tsd of this portion estimated in step S20 (step S21).

Then, the stress-strain curve estimation unit 14 calculates the tensile strength ratio Ss of the tensile strength value σs calculated in step S21 to the reference tensile strength value σsc by the following equation (step S22).

Tensile strength ratio $Ss$=tensile strength value $\sigma s$/reference tensile strength value $\sigma sc$ The stress-strain curve estimation unit 14 calculates the fracture strain ratio Sε of the fracture strain value εF calculated in step S21 to the reference fracture strain value εFc by the following equation (step S23).

Fracture strain ratio $S\epsilon$=fracture strain value $\epsilon F$/reference fracture strain value $\epsilon Fc$ Next, the stress-strain curve estimation unit 14 calculates the damage occurrence strain value εs based on the fracture strain ratio Sε calculated in step S23 and the reference damage occurrence strain value εc by the following equation (step S24).

Figure 10:
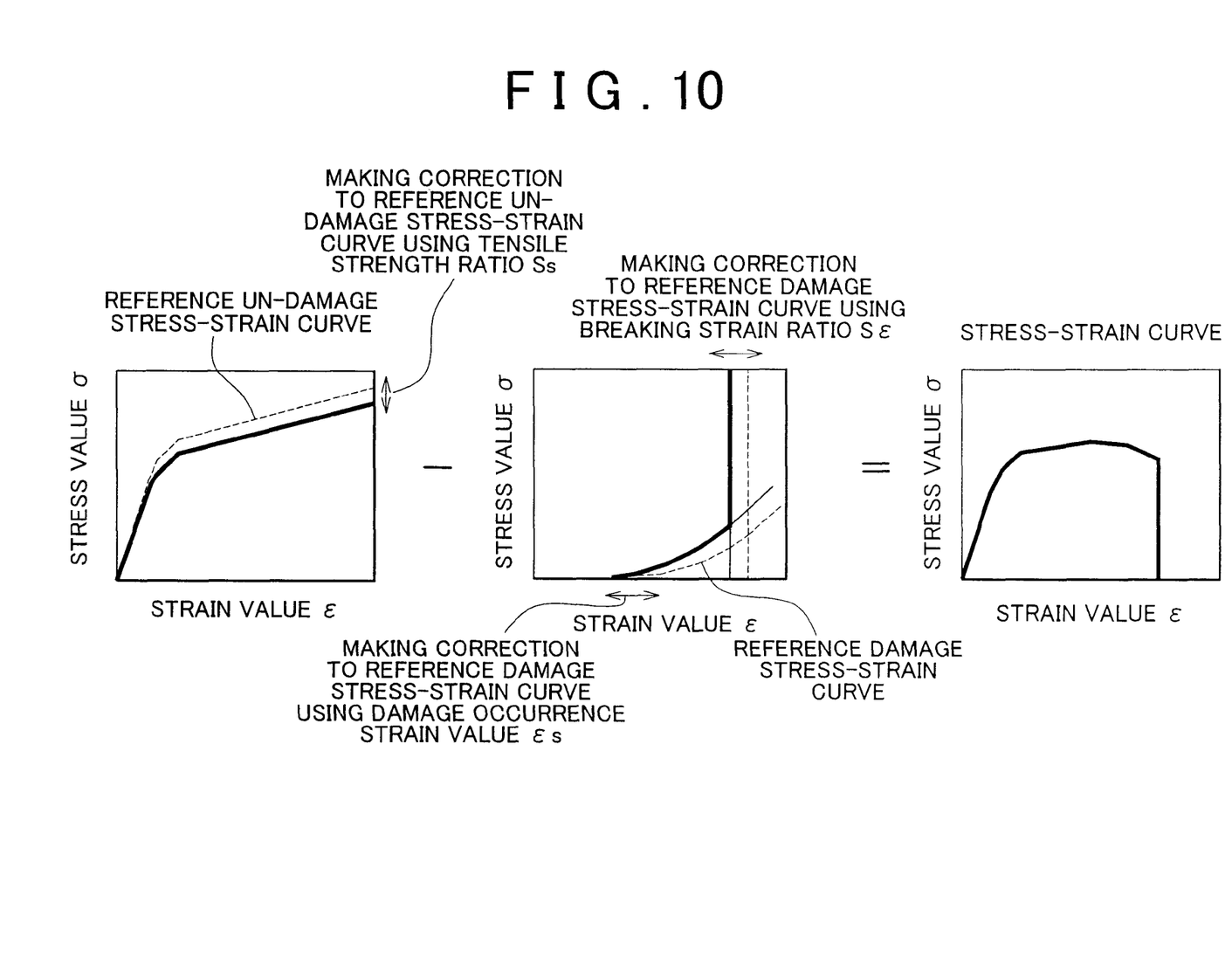
FIG. 10 illustrates the graphs for describing the manner in which the stress-strain curve of each portion of the to-be-produced molded-component is set according to the second embodiment of the invention.

Damage occurrence strain value $\epsilon s$=reference damage occurrence strain value $\epsilon c\times$fracture strain ratio $S\epsilon$ As shown in FIG. 10, the stress-strain curve estimation unit 14 derives the un-damage stress-strain curve of this portion by making a correction to the reference un-damage stress-strain curve. The stress-strain curve estimation unit 14 derives the un-damage stress-strain curve of this portion so that the stress value of the portion, which is correlated with a given strain value ε, coincides with the value obtained by multiplying the stress value, correlated with the given strain value ε along the reference un-damage stress-strain curve, by the tensile strength ratio Ss (step S25). Then, the stress-strain curve estimation unit 14 derives the damage stress-strain curve of this portion by making corrections to the reference damage stress-strain curve. The stress-strain curve estimation unit 14 derives the damage stress-strain curve of this portion by shifting the reference damage stress-strain curve in the direction, in which the axis representing the strain value extends, so that the damage stress-strain curve of this portion passes the damage occurrence strain value εs, and by setting the maximum value of the strain value ε of this portion to the value obtained by multiplying the maximum strain value ε indicated by the reference damage stress-strain curve by the fracture strain ratio Sε (step S26).

Then, the stress-strain curve estimation unit 14 sets the stress-strain curve of the portion by combining the un-damage stress-strain curve derived by making a correction to the reference un-damage stress-strain curve with the damage stress-strain curve derived by making corrections to the reference damage stress-strain curve (step S27).

The second embodiment of the invention produces the same effects as those obtained according to the first embodiment of the invention.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A molded-component characteristic estimation device that estimates a stress-strain curve of each portion of a molded-component, comprising:
    a storage unit that stores correlation data showing a correlation between solidification time and mechanical characteristics of a material for the molded-component and that stores reference stress-strain curves used as references for deriving the stress-strain curve of each portion of the molded-component; and
    a controller that estimates solidification time of each portion of the molded-component using a shape model of the molded-component, calculates a mechanical characteristic value of each portion based on the correlation data and the estimated solidification time, estimates the stress-strain curve of each portion of the molded-component based on the calculated mechanical characteristic value, and makes a correction to at least one of the reference stress-strain curves based on the calculated mechanical characteristic value to derive the stress-strain curve of each portion.

2. The molded-component characteristic estimation device according to claim 1, wherein
    the reference stress-strain curves include a reference un-damage stress-strain curve, which is derived on an assumption that no damage is caused to the material, and a reference damage stress-strain curve, which is derived on an assumption that damage is caused to the material and which indicates a change in a stress generated in the material due to the damage, and
    the controller makes a correction to at least one of the reference un-damage stress-strain curve and the reference damage stress-strain curve based on the calculated mechanical characteristic value to derive the stress-strain curve of each portion.

3. The molded-component characteristic estimation device according to claim 2, wherein
    the correlation data includes data showing correlation between tensile strength and the solidification time, and
    the controller makes a correction to the reference un-damage stress-strain curve or the reference damage stress-strain curve through scale adjustment based on a tensile strength value of each portion, which corresponds to the estimated solidification time.

4. The molded-component characteristic estimation device according to claim 3, wherein
    the scale adjustment is made using the tensile strength value of each portion based on correction scale factor data that shows a correlation between the tensile strength and the scale factor.

5. The molded-component characteristic estimation device according to claim 3, wherein
    the scale adjustment is made based on a tensile strength ratio that is a ratio of the tensile strength value of each portion to a reference tensile strength value.

6. The molded-component characteristic estimation device according to claim 2, wherein
    the correlation data includes data showing a correlation between fracture strain and the solidification time, and
    the controller makes a correction to the reference damage stress-strain curve to derive a damage stress-strain curve used to derive the stress-strain curve of each portion so that a maximum strain value indicated by the damage stress-strain curve derived through the correction coincides with a fracture strain value of each portion, which corresponds to the estimated solidification time.

7. The molded-component characteristic estimation device according to claim 6, wherein
    the controller makes a correction to the reference damage stress-strain curve to derive a damage stress-strain curve used to derive the stress-strain curve of each portion so that a strain value obtained by correcting a maximum strain value indicated by the reference damage stress-strain curve using a fracture strain ratio, which is a ratio of a fracture strain value of each portion to a reference fracture strain value, coincides with a maximum strain value of each portion.

8. The molded-component characteristic estimation device according to claim 2, wherein
    the correlation data includes data showing a correlation between fracture strain and the solidification time, and
    the controller makes a correction to the reference damage stress-strain curve to derive the damage stress-strain curve used to derive the stress-strain curve of each portion so that a strain value obtained by correcting a damage occurrence point on the reference damage stress-strain curve using a fracture strain value of each portion, which corresponds to the estimated solidification time, coincides with a damage occurrence point of each portion.

9. The molded-component characteristic estimation device according to claim 8, wherein
    the correction is made using a fracture strain ratio that is a ratio of the fracture strain value of each portion to a reference fracture strain value.

10. A molded-component characteristic estimation method for estimating a stress-strain curve of each portion of a molded-component, comprising:
    storing correlation data showing a correlation between solidification time and mechanical characteristics of a material for the molded-component;
    storing reference stress-strain curves used as references for deriving the stress-strain curve of each portion of the molded-component;
    estimating solidification time of each portion of the molded-component using a shape model of the molded-component;
    calculating a mechanical characteristic value of each portion based on the correlation data and the estimated solidification time;
    estimating the stress-strain curve of each portion of the molded-component based on the calculated mechanical characteristic value; and making a correction to at least one of the reference stress-strain curves based on the calculated mechanical characteristic value to derive the stress-strain curve of each portion.

11. A computer readable medium including computer executable instructions, wherein the instructions, when executed by a processor, cause the processor to perform a method for estimating a stress-strain curve of each portion of a molded-component, comprising:

storing correlation data showing a correlation between solidification time and mechanical characteristics of a material for the molded-component;

storing reference stress-strain curves used as references for deriving the stress-strain curve of each portion of the molded-component;

estimating solidification time of each portion of the molded-component using a shape model of the molded-component;

calculating a mechanical characteristic value of each portion based on the correlation data and the estimated solidification time;

estimating the stress-strain curve of each portion of the molded-component based on the calculated mechanical characteristic value; and making a correction to at least one of the reference stress-strain curves based on the calculated mechanical characteristic value to derive the stress-strain curve of each portion.

\* \* \* \* \*